Oct. 7, 1941.           C. E. RICHARDS                 2,257,857
                        HYDRAULIC BRAKE
                   Filed April 1, 1941           2 Sheets-Sheet 1

Inventor

CHARLES E. RICHARDS

By  Clarence A. O'Brien

Attorney

Oct. 7, 1941.  C. E. RICHARDS  2,257,857
HYDRAULIC BRAKE
Filed April 1, 1941  2 Sheets-Sheet 2
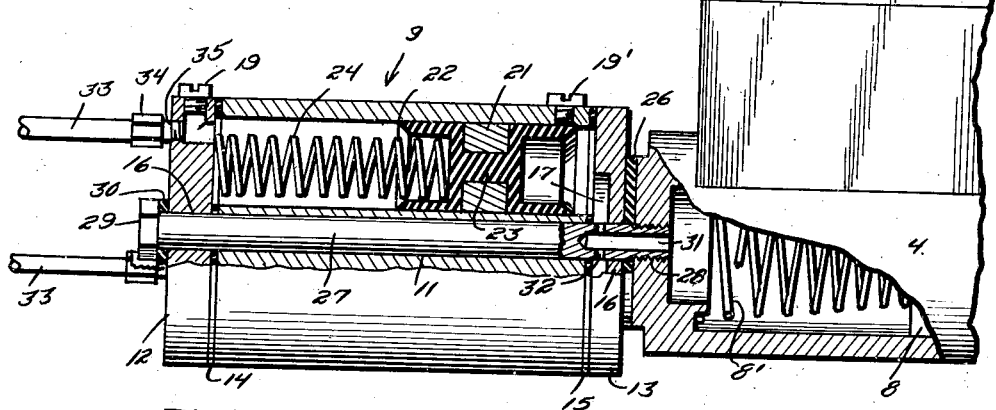
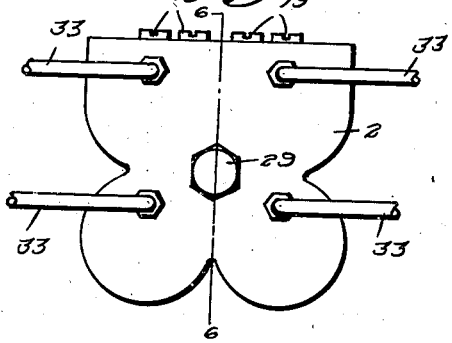
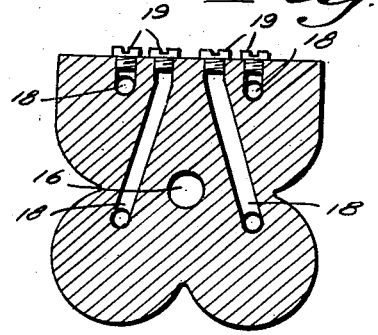
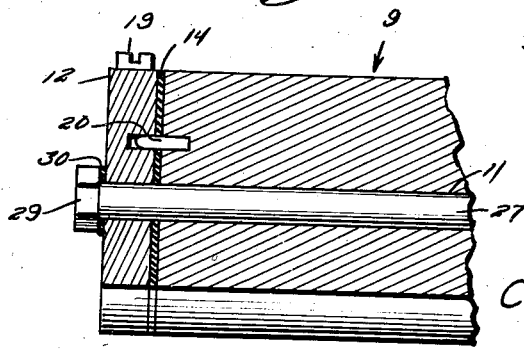
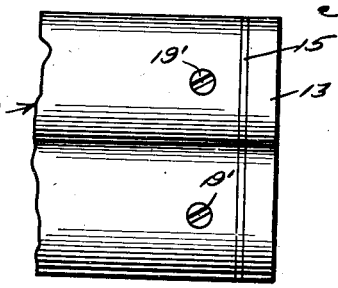
Inventor
CHARLES E. RICHARDS
By Clarence A O'Brien
Attorney Patented Oct. 7, 1941

2,257,857

UNITED STATES PATENT OFFICE 2,257,857

HYDRAULIC BRAKE

Charles E. Richards, Clarksburg, W. Va., assignor of one-half to Okey Marshall, Clarksburg, W. Va.

Application April 1, 1941, Serial No. 386,349

2 Claims. (Cl. 303—84)

My invention relates to improvements in hydraulic brakes for automobiles and more particularly to safety equipment therefor.

By way of explanation, in the hydraulic braking systems of present-day automobiles, it is the common practice to connect the master cylinder directly to the brake operating cylinders through a single hydraulic pressure line. If a leak occurs in any part of such a connection between the brake operating cylinders and the master cylinder, all of the brakes will be rendered useless.

Having the foregoing in mind, it is the principal object of my invention to provide safety means of practical inexpensive construction which may be embodied in such brake systems without material alteration in the basic arrangement thereof to positively prevent all the brakes from being rendered useless in the event of leakage in the line of connection to one brake operating cylinder.

Another object is to provide means of the character and for the purpose above set forth, whereby loss of braking fluid from the master cylinder is prevented in the event of a leak occurring between said cylinder and any one of the brakes.

To the accomplishment of the above, and subordinate objects presently appearing, a preferred embodiment of my invention has been illustrated in the accompanying drawings, set forth in detail in the succeeding description, and defined in the claims appended hereto.

Figure 1:
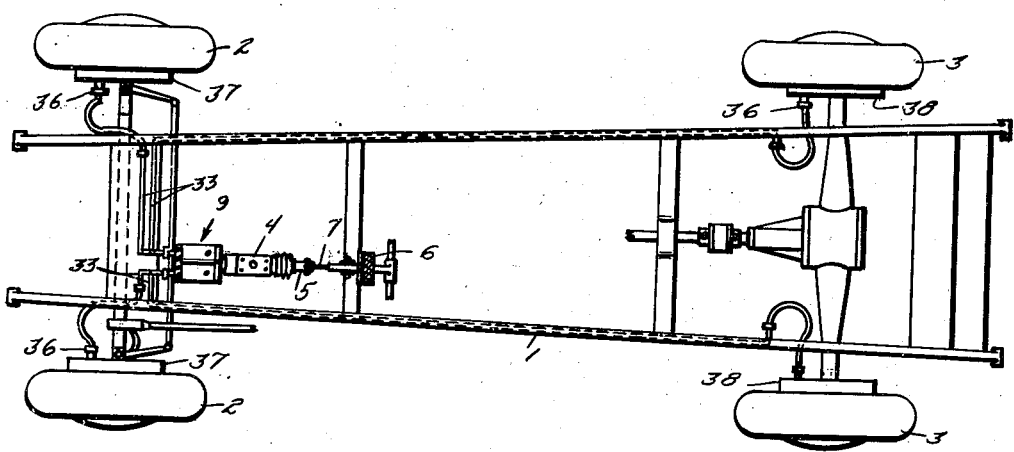
Figure 2:
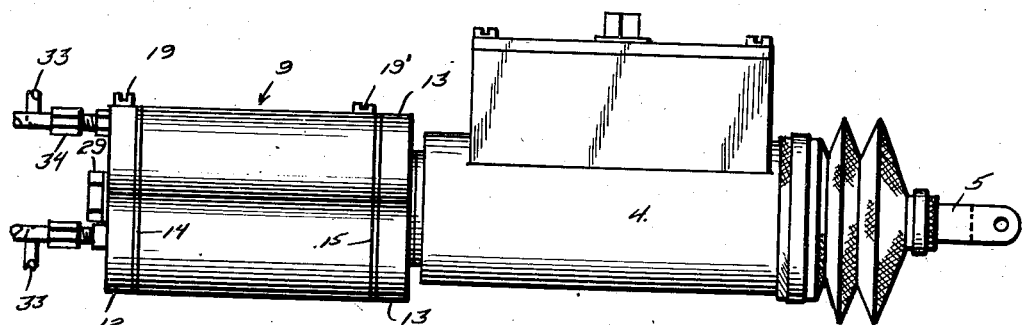
Figure 7:
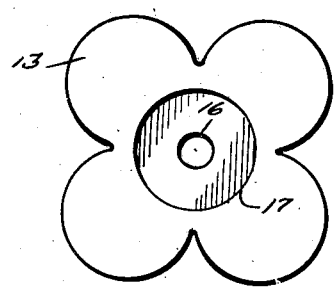
Figure 8:
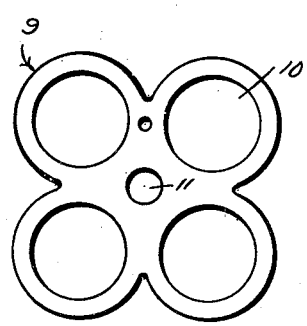

In said drawings:

Figure 1 is a view in top plan illustrating my invention applied in the brake system of an automobile, Figure 2 is a view in side elevation of the master cylinder and the auxiliary cylinder assembly together with parts associated with each, and drawn to an enlarged scale, Figure 3 is a fragmentary view in vertical horizontal section of the auxiliary cylinder assembly and master cylinder, Figure 4 is a view in front elevation of the auxiliary cylinder, Figure 5 is a fragmentary top plan view of said auxiliary cylinder, Figure 6 is a fragmentary view in vertical longitudinal section taken on the line 6—6 of Figure 4, Figure 7 is a view in end elevation of the auxiliary cylinder assembly with the cylinder heads detached, Figure 8 is a view in rear elevation of the rear cylinder head of the auxiliary cylinder assembly, and Figure 9 is a sectional view of the front cylinder head showing the several filler ports.

Reference being had to the drawings by numerals, I have shown my invention therein as applied to the brake system of an automobile, the chassis and running gear, only, being shown as sufficient for the present purposes, and in which showing the numeral 1 designates the chassis, 2 the front wheels, and 3 the rear wheels, the numeral 4 designating the usual master cylinder, 5 the piston rod operative by the brake pedal 6 through the usual connections designated 7, as a unit, and operating the master piston, shown in part at 8, in Figure 3, in opposition to the spring 8'.

According to my invention, an auxiliary cylinder assembly is provided which comprises a cylinder block 9 cast, or otherwise formed, to provide four cylinders 10 grouped in parallel relation about a common center, substantially in the form of a clover leaf, said block having a central axial, smaller bore 11 extending therethrough, the cylinders 10 by virtue of the described arrangement providing an upper and a lower pair.

A pair of front and rear cylinder heads 12, 13, are opposed to what constitutes the front and rear ends of said block 9, respectively, to close the cylinders 10, suitable gaskets 14, 15, being interposed between said heads and blocks and the heads 12, 13, being bored, as at 16, in alignment with the bore 11. The heads 12, 13, are shaped to correspond with the transverse shape of the block 9, with the exception of the front head 12 which has an upper straight edge for a purpose presently seen. The gaskets 14, 15, correspond in shape to the ends of the block 9. The rear cylinder head 13 is provided in its inner face with a circular recess, or counter-sink 17 concentric to the bore 16, said recess opening into each cylinder 10 for a purpose presently seen. The front cylinder head 12 has extending downwardly therein from its top edge a plurality of filler ports 18 communicating at their lower ends with the front ends of the cylinders 9, preferably at the tops of the latter, and through which the cylinders may be loaded with brake fluid. Screw plugs 19 close the tops of said ports 18. A screw plug 19' is provided in the rear portion of each cylinder 10 for releasing air from the cylinder to facilitate loading said cylinders. Key pins, as at 20, suitably extending between the cylinder heads 12, 13, and ends of the block 9 prevent the heads from turning on the blocks.

Endwise slidable in each cylinder 9 is an annular piston, as at 21. Each piston 21 is provided with a pair of cup-type resilient members 22 upon opposite sides thereof, respectively, with bevelled outer ends and slidably fitted in the cylinder 10, said members 22 being connected by an axial core 23 extending through the piston. Preferably the members 22 and core 23 are formed of rubber composition molded in the piston. A coil spring, as at 24, in each cylinder and interposed between the front cylinder head 12 and the front cup member 22, into which the spring is fitted, urges the piston 21 and cup member 22 rearwardly in each cylinder 10.

The described auxiliary cylinder assembly is secured to the front end of the master cylinder 4, with the rear cylinder head 13 opposed to said end, and a suitable gasket 26 interposed between said auxiliary and master cylinders, the securing means comprising the following.

Extending through the bore 11 of the block 9 and likewise through the bores 16 in the cylinder heads 12, 13, is a single bolt 27 having a tail end threaded into the front end of the master cylinder 4, as at 28, and a head 29 bearing against a suitable washer 30 interposed between said head 29 and the front cylinder head 12. The tail end of the bolt 27 is provided with an axial bore 31 therein extending forwardly of the recess 17 of the rear cylinder head 13, said bolt being diametrically bored, as at 32, to establish communication between the bore 31 and said recess 17.

A plurality of separate, fluid pressure lines 33 are coupled at rear ends thereof, as by couplings 34, to a plurality of nipples 35 tapped into the front cylinder head 12 to communicate with the bottoms of the ports 18, said lines being suitably connected, as represented at 36, to the front and rear wheel brakes represented at 37 and 38.

The use and operation of my described invention will be readily understood. The cylinders 10 and fluid pressure lines 33, which as will be manifest, lead to the brake operating cylinders, not shown, are filled with brake fluid through the ports 18. Under operation of the brake pedal 5, fluid pressure in the master cylinder 4 is introduced into the cylinders 10 behind the rearmost cup members 22, and by way of the bores 31, 32 and recess 17, to drive the pistons 21 forwardly in opposition to the springs 24. Such operation of said pistons 21 creates fluid pressure in the cylinders 10 and fluid pressure lines 33 to be communicated to the brake operating cylinders, not shown, of the front and rear brakes 37, 38. If a leak occurs in any of the fluid pressure lines 33, or brake operating cylinders, the cup members 22 of the appropriate cylinder 10 form seals between said cylinder and the damaged line or brake operating cylinder, preventing fluid from the master cylinder 4 from becoming lost.

The foregoing will, it is believed, suffice to impart a clear understanding of my invention without further explanation.

Manifestly the invention, as described, is susceptible of modification without departing from the inventive concept, and right is herein reserved to such modifications as fall within the scope of the subjoined claims.

What I claim is:

1. In a hydraulic brake system for an automobile having four wheel brakes, the combination with a master fluid pressure cylinder, of a cylinder block including a plurality of auxiliary cylinders, one for each of the brakes, grouped around a common center, a pair of cylinder heads for opposite ends of said block, respectively, means to attach said block to the master cylinder with the latter in communication with one end of each of said auxiliary cylinders to introduce pressure thereinto, pistons in said auxiliary cylinders spring tensioned against such pressure in the auxiliary cylinders, and means to establish communication between the other ends of said auxiliary cylinders and said brakes, respectively, comprising separate fluid pressure lines, the means first-mentioned comprising a single headed shaft extending axially through said block and through said heads, said shaft having a tail end threaded into said master cylinder and ported axially and diametrically, and one of said cylinder heads having a central countersink in the inner face thereof opening into each of said auxiliary cylinders and surrounding the diametrical ports.

2. In a hydraulic brake system for an automobile having four wheel brakes, the combination with a master fluid pressure cylinder, of a cylinder block including a plurality of auxiliary cylinders, one for each of the brakes, grouped around a common center, a pair of cylinder heads for opposite ends of said block, respectively, means to attach said block to the master cylinder with the latter in communication with one end of each of said auxiliary cylinders to introduce pressure thereinto, pistons in said auxiliary cylinders spring tensioned against such pressure in the auxiliary cylinders, and means to establish communication between the other ends of said auxiliary cylinders and said brakes, respectively, comprising separate fluid pressure lines, one of said heads having a plurality of filler ports in the plane thereof opening into said auxiliary cylinders, respectively, and into said pressure lines for loading said cylinders and lines with brake fluid.

CHARLES E. RICHARDS.